United States Patent
Shi et al.

(10) Patent No.: US 12,278,775 B2
(45) Date of Patent: Apr. 15, 2025

(54) MBSFN SUBFRAME PROCESSING METHOD AND APPARATUS, BASE STATION AND USER EQUIPMENT

(71) Applicant: ZTE Corporation, Shenzhen (CN)

(72) Inventors: Fubo Shi, Shenzhen (CN); Xiaohui Hou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 418 days.

(21) Appl. No.: 17/762,539

(22) PCT Filed: Jul. 30, 2020

(86) PCT No.: PCT/CN2020/105926
§ 371 (c)(1),
(2) Date: Mar. 22, 2022

(87) PCT Pub. No.: WO2021/057249
PCT Pub. Date: Apr. 1, 2021

(65) Prior Publication Data
US 2022/0385422 A1    Dec. 1, 2022

(30) Foreign Application Priority Data

Sep. 23, 2019 (CN) .......................... 201910898197.8

(51) Int. Cl.
*H04L 5/00* (2006.01)
*H04L 25/02* (2006.01)
*H04W 72/30* (2023.01)

(52) U.S. Cl.
CPC ........... *H04L 5/0048* (2013.01); *H04W 72/30* (2023.01)

(58) Field of Classification Search
CPC ... H04L 5/0048; H04L 5/0094; H04L 5/0007; H04L 25/0226; H04L 25/0224; H04W 72/30
See application file for complete search history.

(56) References Cited

U.S. PATENT DOCUMENTS 11,102,757 B2 * 8/2021 Tang .................... H04L 5/00
2014/0016681 A1 1/2014 Muruganathan
(Continued)

FOREIGN PATENT DOCUMENTS

| CN | 102007807 A | 4/2011 |
| CN | 102160300 A | 8/2011 |

(Continued)

OTHER PUBLICATIONS

International Search Report for corresponding application PCT/CN2020/105926 filed Jul. 30, 2020; Mail date Sep. 29, 2020.
(Continued)

*Primary Examiner* — Joseph E Dean, Jr.
(74) *Attorney, Agent, or Firm* — CANTOR COLBURN LLP (57) ABSTRACT

Provided are a Multicast Broadcast Single Frequency Network (MBSFN) subframe processing method and apparatus, a base station and user equipment. In the solution, a base station places an MBSFN Reference Signal (RS) in a 0-filling region of an MBSFN subframe for transmission, thus making full use of time frequency resources, and facilitating User Equipment (UE) in performing channel estimation by using the MBSFN RS during reception.

20 Claims, 5 Drawing Sheets

(56) References Cited

U.S. PATENT DOCUMENTS

| | | | | |
|---|---|---|---|---|
| 2015/0208208 A1* | 7/2015 | You | ..................... | H04W 72/30 370/312 |
| 2016/0007319 A1* | 1/2016 | He | ..................... | H04B 7/0486 370/312 |
| 2020/0014573 A1* | 1/2020 | Liu | ..................... | H04W 72/23 |

FOREIGN PATENT DOCUMENTS

| | | |
|---|---|---|
| CN | 103190113 A | 7/2013 |
| EP | 2639989 A1 | 9/2013 |
| WO | 2012116109 A2 | 8/2012 |
| WO | 2013148076 A1 | 10/2013 |

OTHER PUBLICATIONS

European Search report for corresponding application EP20867328, Mail date Oct. 25, 2022.

* cited by examiner

MBSFN SUBFRAME PROCESSING METHOD AND APPARATUS, BASE STATION AND USER EQUIPMENT

CROSS REFERENCE

This application is a National Stage Filing of the PCT International Application No. PCT/CN2020/105926 filed on Jul. 30, 2020, which claims priority to Chinese Application No. 201910898197.8 filed on Sep. 23, 2019, the entirety of which is herein incorporated by reference.

TECHNICAL FIELD

The present disclosure relates to, but is not limited to, a mobile communication technology, in particular to a Multicast Broadcast Single Frequency Network (MBSFN) subframe processing method and apparatus, a base station and User Equipment (UE).

BACKGROUND

At present, a subset of downlink subframes in a radio frame on a subcarrier carrying transmission of a Physical Downlink Shared Channel (PDSCH) may be configured as MBSFN subframes by high-layer signaling. Each MBSFN subframe is divided into an MBSFN domain and a non-MBSFN domain. The non-MBSFN domain occupies the first or the first two Orthogonal Frequency Division Multiplexing (OFDM) symbols of the MBSFN subframe. A Cyclic Prefix (CP) used for the non-MBSFN domain is required to be same as that used for subframe 0 in terms of length. The MBSFN domain is defined as OFDM symbols that are not used for the non-MBSFN domain.

Figure 1:
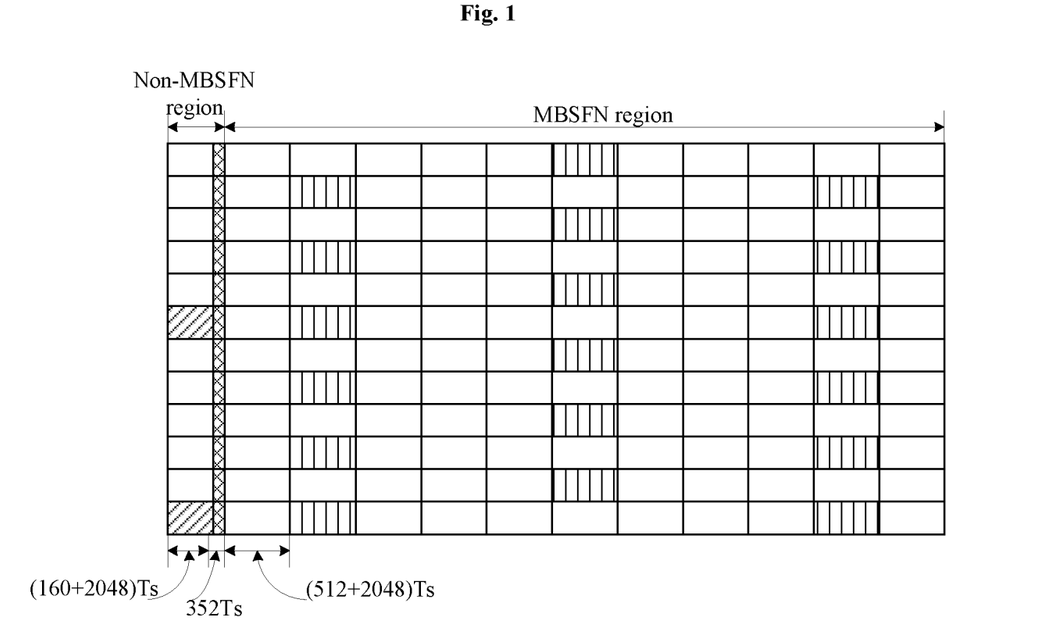
FIG. 1 is a schematic diagram in which a non-MBSFN domain occupies one symbol and uses a normal CP in the related art.
Figure 2:
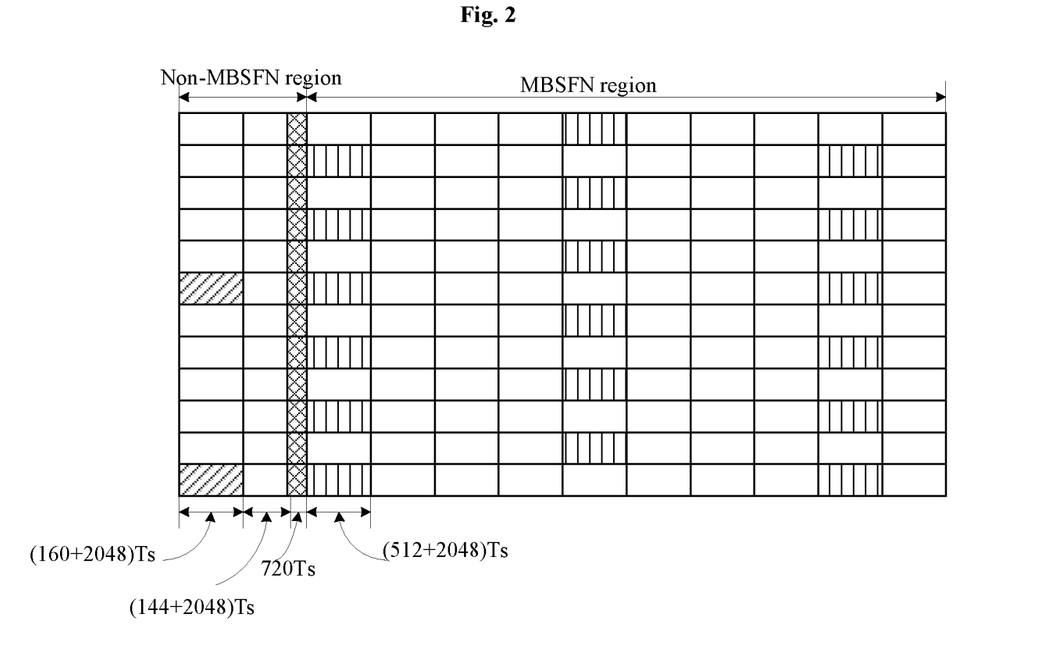
FIG. 2 is a schematic diagram in which a non-MBSFN domain occupies two symbols and uses an extended CP in the related art.

In a case where a normal CP is used for the subframe 0, a normal CP is used for the non-MBSFN domain in the MBSFN subframe, and an extended CP is used for the MBSFN domain in the MBSFN subframe. To ensure alignment of timing of the subframes, special processing is required. In a case where the non-MBSFN domain occupies one OFDM symbol, 0 needs to be filled between OFDM symbol 0 and OFDM symbol 1, as shown in the oblique grid shadow squares in FIG. 1. In a case where the non-MBSFN domain occupies two OFDM symbols, 0 needs to be filled between OFDM symbol 1 and OFDM symbol 2, as shown in the oblique grid shadow squares in FIG. 2. In FIG. 1 and FIG. 2, the oblique grid shadow squares represent the spare parts, the diagonal shadow squares represent cell pilot frequencies, and the vertical stripe shadow squares represent MBSFN pilot frequencies. A time frequency position where 0 is filled is called a 0-filling region of an MBSFN subframe.

It is apparent that these time frequency positions where 0 is filled are not used effectively.

SUMMARY

Embodiments of the present disclosure provide an MBSFN subframe processing method and apparatus, a base station and user equipment, which can effectively use time frequency resources.

The embodiments of the present disclosure provide an MBSFN subframe processing method, which includes the following operations. A base station places an MBSFN Reference Signal (RS) in a 0-filling region of an MBSFN subframe. The base station transmits the MBSFN subframe carrying the MBSFN RS.

In an exemplary embodiment, the operation that the base station places the MBSFN RS in the 0-filling region of the MBSFN subframe includes that: the MBSFN RS is placed in the 0-filling region of the MBSFN subframe in an ascending order of frequency.

In an exemplary embodiment, the operation that the base station places the MBSFN RS in the 0-filling region of the MBSFN subframe includes that: in a case where the MBSFN RS consists of two groups of completely consistent sequences, one group of sequences are placed at positions of even-numbered subcarriers in the 0-filling region of the MBSFN subframe, and the other group of sequences are placed at positions of odd-numbered subcarriers in the 0-filling region of the MBSFN subframe.

In an exemplary embodiment, the method further includes that: the base station sends indication information through a system message to notify a UE whether the MBSFN subframe carries the MBSFN RS.

In an exemplary embodiment, the system message is a System Information Block-13 (SIB13) message.

In an exemplary embodiment, the operation that the base station sends indication information through a system message to notify a UE whether the MBSFN subframe carries the MBSFN RS includes that: one bit in a late Non Critical Extension field of the SIB13 message is used as the indication information to indicate whether there is MBSFN RS transmitted in the 0-filling region of the MBSFN subframe.

The embodiments of the present disclosure provide a computer-readable storage medium, in which a computer-executable instruction is stored. The computer-executable instruction is used for executing the MBSFN subframe processing method.

The embodiments of the present disclosure provide an MBSFN subframe processing apparatus, which includes a processor and a memory. A computer program capable of running in the processor is stored in the memory for executing the operations of the MBSFN subframe processing method described above.

The embodiments of the present disclosure provide a base station, which includes the MBSFN subframe processing apparatus described above.

The embodiments of the present disclosure provide another MBSFN subframe processing method, which includes the following operations.

A UE determines that a 0-filling region of an MBSFN subframe carries an MBSFN RS.

The UE determines a time-domain position of the 0-filling region of the MBSFN subframe, and obtains the MBSFN RS in the 0-filling region of the MBSFN subframe.

In an exemplary embodiment, the operation that the UE determines that the 0-filling region of the MBSFN subframe carries the MBSFN RS includes that: the UE reads indication information in a system message from a base station, and determines, according to the indication information, whether the 0-filling region of the MBSFN subframe carries the MBSFN RS.

In an exemplary embodiment, the system message is an SIB13 message. The operation of determining, according to the indication information, whether the 0-filling region of the MBSFN subframe carries the MBSFN RS includes that: it is determined, according to the indication information in a late Non Critical Extension field of the SIB13 message, whether there is MBSFN RS transmitted in the 0-filling region of the MBSFN subframe.

In an exemplary embodiment, the operation that the UE determines that the 0-filling region of the MBSFN subframe carries the MBSFN RS includes that: the UE performs blind demodulation in the 0-filling region of the MBSFN subframe, and determines, according to obtained signal characteristics, whether the 0-filling region of the MBSFN subframe carries the MBSFN RS.

In an exemplary embodiment, the signal characteristics include: an average power of a received signal in the 0-filling region of the MBSFN subframe and a Signal-to-Noise Ratio (SINR) of the received signal in the 0-filling region of the MBSFN subframe.

The operation of determining, according to the obtained signal characteristics, whether the 0-filling region of the MBSFN subframe carries the MBSFN RS includes that: in a case where the obtained average power of the received signal in the 0-filling region of the MBSFN subframe is greater than a preset noise and interference threshold, and/or the SINR of the received signal in the 0-filling region of the MBSFN subframe is greater than a preset SINR threshold, it is determined that the 0-filling region of the MBSFN subframe carries the MBSFN RS.

The embodiments of the present disclosure provide a computer-readable storage medium, in which a computer-executable instruction is stored. The computer-executable instruction is used for executing another MBSFN subframe processing method described above.

The embodiments of the present disclosure provide an MBSFN subframe processing apparatus, which includes a processor and a memory. A computer program capable of running in the processor is stored in the memory for executing the operations of another MBSFN subframe processing method described above.

The embodiments of the present disclosure provide a UE, which includes another MBSFN processing apparatus described above.

In the embodiments of the present disclosure, the base station places the MBSFN RS in the 0-filling region of the MBSFN subframe for transmission, thus making full use of time frequency resources, and facilitating the UE in performing channel estimation by using the MBSFN RS during reception.

Other characteristics and advantages of the embodiments of the present disclosure will be elaborated in the subsequent specification, and become in part apparent from the specification or become known through the implementation of the embodiments of the present disclosure. The purposes and other advantages of the embodiments of the present disclosure may be realized and obtained through the structures specified in the specification, the claims and the accompanying drawings.

BRIEF DESCRIPTION OF THE DRAWINGS

The accompanying drawings are used for providing further understanding of the technical solution of the embodiments of the present disclosure, and constitute a part of the specification. The accompanying drawings are used for illustrating the technical solution of the present disclosure together with the embodiments of the present disclosure, and not intended to form a limit to the technical solution of the present disclosure.

DETAILED DESCRIPTION

In a typical configuration of the embodiments of the present disclosure, a computing device includes one or more than one processor (e.g., Central Processing Unit (CPU)), input/output interface, network interface, and memory.

The memory includes a volatile memory, a Random Access Memory (RAM) and/or a nonvolatile memory, and other forms in computer-readable media, for example, a Read Only Memory (ROM) or a flash RAM. The memory is an example of the computer-readable media.

The computer-readable media include permanent and non-permanent, movable and non-movable media that can realize information storage by any ways or technologies. The information may be computer-readable instructions, data structures, modules of a program, or other data. Examples of the computer storage media include, but are not limited to, a Phase-Change Memory (PRAM), a Static Random Access Memory (SRAM), a Dynamic Random Access Memory (DRAM), other types of RAM, ROM, and Electrically Erasable Programmable Read-Only Memory (EEPROM), a flash memory or other memory technologies, a CD-ROM, a Digital Video Disk (DVD) or other optical memories and magnetic cassette tapes, magnetic tape disk storage or other magnetic storage devices or any other non-transmission media, which may be configured to store information that can be accessed by the computing device. As defined in the specification, the computer-readable media do not include computer-readable transitory media, such as modulated data signals and carriers.

In order to make the purpose, technical solutions and advantages of the present disclosure clearer, the embodiments of the present disclosure will be described below in combination with the drawings in detail. It is to be noted that the embodiments in the present disclosure and the characteristics in the embodiments may be combined under the condition of no conflicts.

Figure 3:
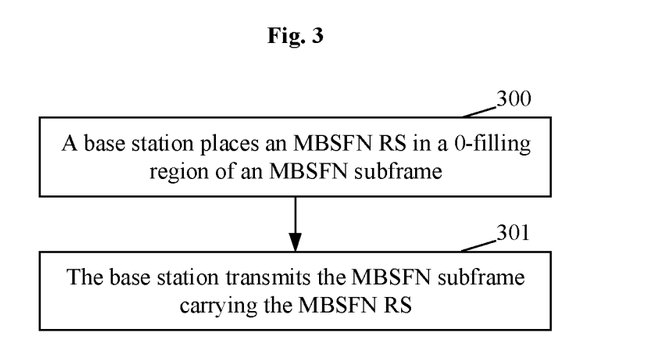
FIG. 3 is a flowchart of an MBSFN subframe processing method according to some embodiments of the present disclosure.

FIG. 3 is a flowchart of an MBSFN subframe processing method according to some embodiments of the present disclosure. As shown in FIG. 3, the method includes at least the following operations.

At S300, a base station places an MBSFN RS in a 0-filling region of an MBSFN subframe.

In an exemplary embodiment, S300 may include the following operation.

Figure 4:
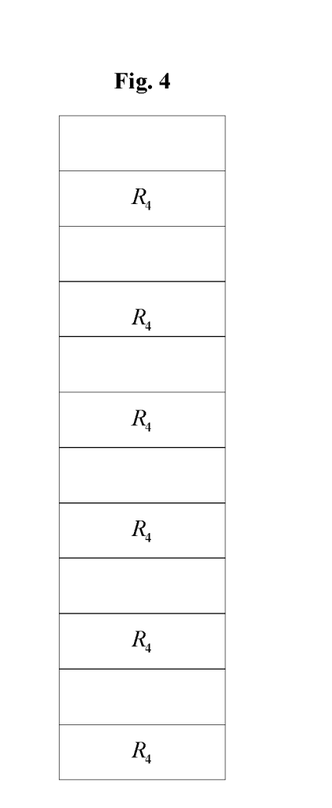
FIG. 4 is a schematic diagram of a format of an MBSFN RS according to some embodiments of the present disclosure.

The RS is placed in the 0-filling region of the MBSFN subframe in an ascending order of frequency, as shown in the positions $R_4$ in FIG. 4.

In an exemplary embodiment, S300 may include the following operation.

Figure 5:
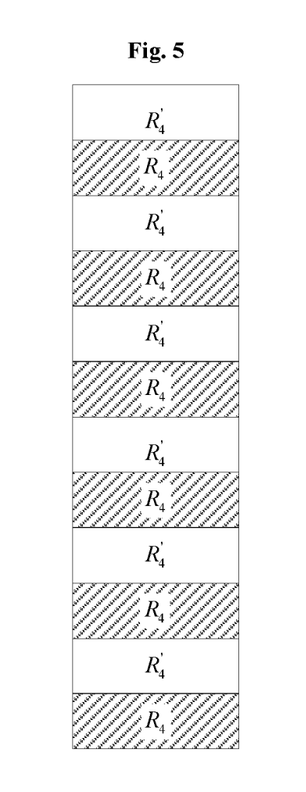
FIG. 5 is a schematic diagram of another format of an MBSFN RS according to some embodiments of the present disclosure.

The RS may consist of two groups of completely consistent sequences, one group of sequences are placed at positions of even-numbered subcarriers in the 0-filling region of the MBSFN subframe, as shown in the positions $R_4$ in FIG. 5, and the other group of sequences are placed at positions of odd-numbered subcarriers in the 0-filling region of the MBSFN subframe, as shown in the positions $R'_4$ in FIG. 5. In the implementation, all subcarriers of each RB are used to transmit the RS, and all frequency domain positions in the 0-filling region of the MBSFN subframe carry the RS, thus using each subcarrier, making full use of time frequency resources, and facilitating the UE in performing channel estimation by using the MBSFN RS during reception.

In an exemplary embodiment, $R_4$ and $R'_4$ sequences may be generated according to formula (1):

$$r(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, 6N_{RB}^{max,DL} - 1$$

It is to be noted that the generation of the RS is not limited to the above way, as long as the sequence is a random sequence with good randomness.

In an exemplary embodiment, in order to facilitate the unification of channel estimation, a transmitting power of the RS in the 0-filling region of the MBSFN subframe may be set to be equal to a transmitting power of the RS in a multicast region of the MBSFN.

At S301, the base station transmits the MBSFN subframe carrying the MBSFN RS.

In an exemplary embodiment, the MBSFN subframe processing method of the present disclosure may further include the following operation.

The base station sends indication information through a system message to notify a UE whether the MBSFN subframe carries the MBSFN RS.

In an exemplary embodiment, the system message may be an SIB13 message in the related art. In an exemplary embodiment, the operation that the base station sends the indication information through the system message to notify the UE whether the MBSFN subframe carries the MBSFN RS may include the following operation.

Figure 6:
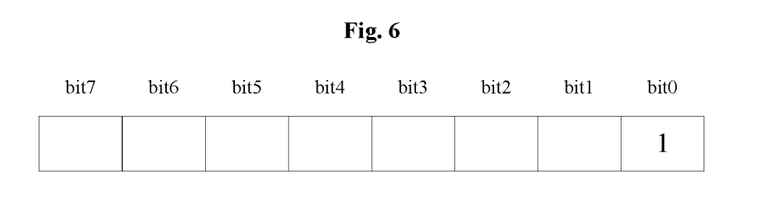
FIG. 6 is a schematic diagram of notifying through a system message whether an MBSFN subframe carries an MBSFN RS according to some embodiments of the present disclosure.

As shown in FIG. 6, one bit in a late Non Critical Extension field of the SIB13 message is used as the indication information to indicate whether there is MBSFN RS transmitted in the 0-filling region of the MBSFN subframe, for example, 0 indicates that there is no MBSFN RS transmitted in the 0-filling region of the MBSFN subframe, and 1 indicates that there is MBSFN RS transmitted in the 0-filling region of the MBSFN subframe.

The embodiments of the present disclosure provide a computer-readable storage medium, in which a computer-executable instruction is stored. The computer-executable instruction is used for executing the MBSFN subframe processing method shown in FIG. 3.

The embodiments of the present disclosure provide an MBSFN subframe processing apparatus, which includes a processor and a memory. A computer program capable of running in the processor is stored in the memory for executing the operations of the MBSFN subframe processing method shown in FIG. 3.

The embodiments of the present disclosure provide a base station, which includes the above MBSFN subframe processing apparatus.

Figure 7:
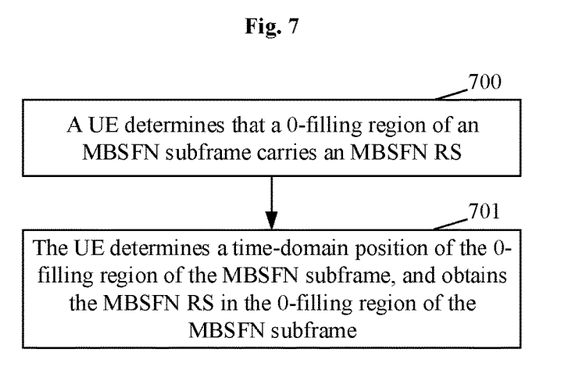
FIG. 7 is a flowchart of another MBSFN subframe processing method according to some embodiments of the present disclosure.

FIG. 7 is a flowchart of another MBSFN subframe processing method according to some embodiments of the present disclosure. As shown in FIG. 7, the method includes at least the following operations.

At S700, a UE determines that a 0-filling region of an MBSFN subframe carries an MBSFN RS.

In an exemplary embodiment, this operation may include the following operation.

The UE reads indication information in a system message from the base station, and determines, according to the indication information, whether the 0-filling region of the MBSFN subframe carries the MBSFN RS.

In an exemplary embodiment, the system message may be an SIB13 message in the related art. In an exemplary embodiment, the operation of determining, according to the indication information, whether the 0-filling region of the MBSFN subframe carries the MBSFN RS may include the following operation.

It is determined, according to the indication information, for example, one bit in a late Non Critical Extension field of the SIB13, whether there is MBSFN RS transmitted in the 0-filling region of the MBSFN subframe. For example, the indication information 0 indicates that there is no MBSFN RS transmitted in the 0-filling region of the MBSFN subframe, and the indication information 1 indicates that there is MBSFN RS transmitted in the 0-filling region of the MBSFN subframe.

In an exemplary embodiment, S700 may include the following operation.

The UE performs blind demodulation in the 0-filling region of the MBSFN subframe, and determines, according to obtained signal characteristics, whether the 0-filling region of the MBSFN subframe carries the MBSFN RS.

In an exemplary embodiment, the signal characteristics may include: an average power of a received signal in the 0-filling region of the MBSFN subframe and/or an SINR of the received signal in the 0-filling region of the MBSFN subframe.

In an exemplary embodiment, the operation of determining, according to obtained signal characteristics, whether the 0-filling region of the MBSFN subframe carries the MBSFN RS may include the following operation.

in a case where the obtained average power of the received signal in the 0-filling region of the MBSFN subframe is greater than a preset noise and interference threshold, or the SINR of the received signal in the 0-filling region of the MBSFN subframe is greater than a preset SINR threshold, it is determined that the 0-filling region of the MBSFN subframe carries the MBSFN RS.

For example, the UE calculates the average received power RSRP (denoted by $P^0$) of the signal transmitted in the 0-filling region of the MBSFN subframe, or calculates the SINR (denoted by $SINR_0$) of the signal received in the 0-filling region of the MBSFN subframe. In a case where the calculated $P_0$ is greater than a preset noise and interference threshold, or the calculated $SINR_0$ is greater than a preset SINR threshold, it may be determined that the base station transmits an RS in the 0-filling region of the MBSFN subframe.

In an exemplary embodiment, before this operation, the method may also include the following operations.

The UE determines whether an accessed cell adopts a normal CP or an extended CP through a cell selection stage.

The UE obtains the size of a non-controlled cell by demodulating a Physical Control Format Indicator Channel (PCFICH) of the non-controlled cell.

The UE receives signals of the whole MBSFN subframe.

At S701, the UE determines a time-domain position of the 0-filling region of the MBSFN subframe, and obtains the MBSFN RS in the 0-filling region of the MBSFN subframe.

In an exemplary embodiment, the UE only needs to receive the signals of MBSFN subframe from the 0-filling region of the MBSFN subframe and take out the signal corresponding to the RS in the 0-filling region of the MBSFN subframe according to the time-domain position.

In the present disclosure, in a case of determining that the base station has transmitted an RS in the 0-filling region of the MBSFN subframe, the UE may perform subsequent processing, such as channel estimation and frequency offset estimation, by obtaining the RS, and may demodulate MBSFN services by combining the channel estimation and frequency offset obtained through the MBSFN RS.

For a unicast service, there is an RS transmitted in a 0-filling region of an MBSFN subframe according to the embodiment of the present disclosure, so that the UE can use the RS for downlink processing in a unicast state, which is conducive to the improvement of performance of the unicast service.

The embodiments of the present disclosure provide a computer-readable storage medium, in which a computer-executable instruction is stored. The computer-executable instruction is used for executing another MBSFN subframe processing method shown in FIG. 7.

The embodiments of the present disclosure provide an MBSFN subframe processing apparatus, which includes a processor and a memory. A computer program capable of running in the processor is stored in the memory for executing the operations of another MBSFN subframe processing method shown in FIG. 7.

The embodiments of the present disclosure provide a UE, which includes said another MBSFN subframe processing apparatus described above.

The present disclosure is described in detail below in combination with specific embodiments.

Figure 8:
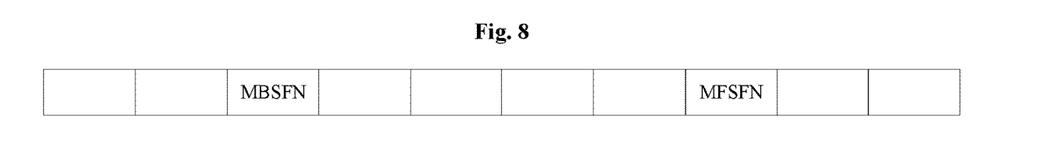
FIG. 8 is a schematic diagram of MBSFN subframe configuration in a first embodiment of implementing MBSFN subframe processing of the present disclosure.

FIG. 8 is a schematic diagram of MBSFN subframe configuration in a first embodiment of implementing MBSFN subframe processing of the present disclosure. As shown in FIG. 8, in the first embodiment, the base station uses subframe 2 and subframe 7 as the MBSFN subframe, transmits the RS in the 0-filling region of the MBSFN subframe, and notifies the UE in the form of system message. In the first embodiment, it is assumed that transmission occupies one bit, which is filled with 1, as shown in FIG. 6. In the embodiment, it is assumed that a non-multicast region of the MBSFN subframe occupies one symbol and the CP is the normal CP. The same transmitting power is used for the RS in the 0-filling region of the MBSFN subframe and the RS in a MBSFN multicast region.

Figure 9:
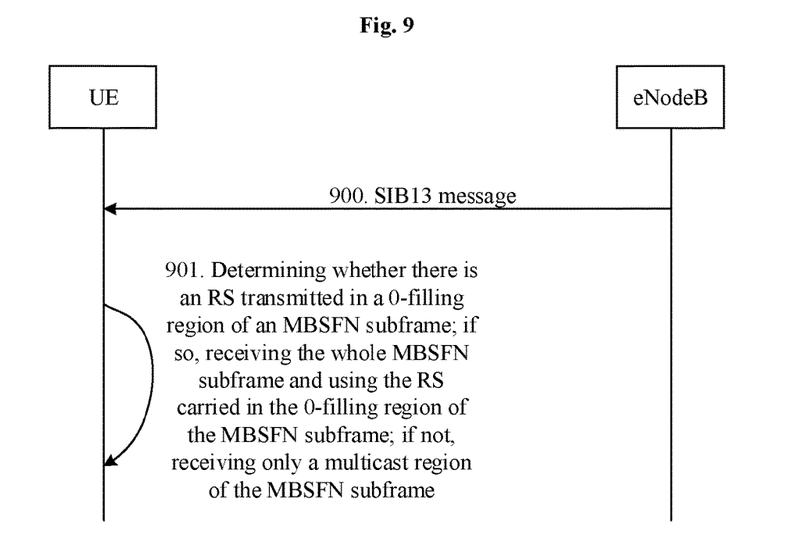
FIG. 9 is a flowchart of a first embodiment of an MBSFN subframe processing method of the present disclosure.

FIG. 9 is a flowchart of a first embodiment of an MBSFN subframe processing method of the present disclosure. As shown in FIG. 9, the method may include the following operations.

At S900, a UE reads an SIB13 message from a base station, as shown in FIG. 6.

At S901, the UE determines, according to the obtained SIB13 message, that a 0-filling region of an MBSFN subframe carries an RS, and receives the whole MBSFN subframe.

In this way, the UE can receive the signal of the MBSFN subframe from the 0-filling region of the MBSFN subframe, takes out the signal corresponding to the RS carried in the 0-filling region of the MBSFN subframe according to the time-domain position, and uses the obtained RS to calculate channel estimation $H_0$ and frequency offset $\Delta f_0$ of all subcarriers of each RB.

The UE calculates the channel estimation $H_{MBSFN}$ and the frequency offset $\Delta f_{MBSFN}$ only at the corresponding position of the multicast region according to the RS of the MBSFN multicast region, that is, the corresponding channel estimation can be directly obtained based on $H_{MBSFN}$ and $\Delta f_{MBSFN}$ only at the transmitting position of the RS, and the channel estimation of other data positions needs to be derived by interpolation algorithm. In this case, the interpolation algorithm can make comprehensive use of a channel estimation result obtained based on the signal corresponding to the RS in the 0-filling region of the MBSFN subframe, and a channel estimation result obtained by the UE based on the RS in the MBSFN multicast region, to perform interpolation to obtain the channel estimation H of data symbol positions in the multicast region.

It is to be noted that the specific calibration method is not limited, for example, the channel estimation of the data symbols in the multicast region may be calculated first by performing interpolation on $H_{MBSFN}$, and then simply averaged with the channel estimation of the corresponding subcarrier position of $H_0$.

In an exemplary embodiment, the UE may also use H to perform equalized demodulation on the data symbols of the signals in the multicast region.

As shown in FIG. 8, in a second embodiment, it is assumed that the base station uses subframe 2 and subframe 7 as the MBSFN subframe, and the base station transmits the RS in the 0-filling region of the MBSFN subframe. However, in the second embodiment, the UE determines whether there is an RS transmitted in a 0-filling region of an MBSFN subframe by performing blind demodulation to the signal in the 0-filling region of the MBSFN subframe. In the embodiment, a non-multicast region of the MBSFN subframe occupies one symbol and the CP is the normal CP. The same transmitting power is adopted for the RS in the 0-filling region of the MBSFN subframe and the RS in a MBSFN multicast region.

Figure 10:
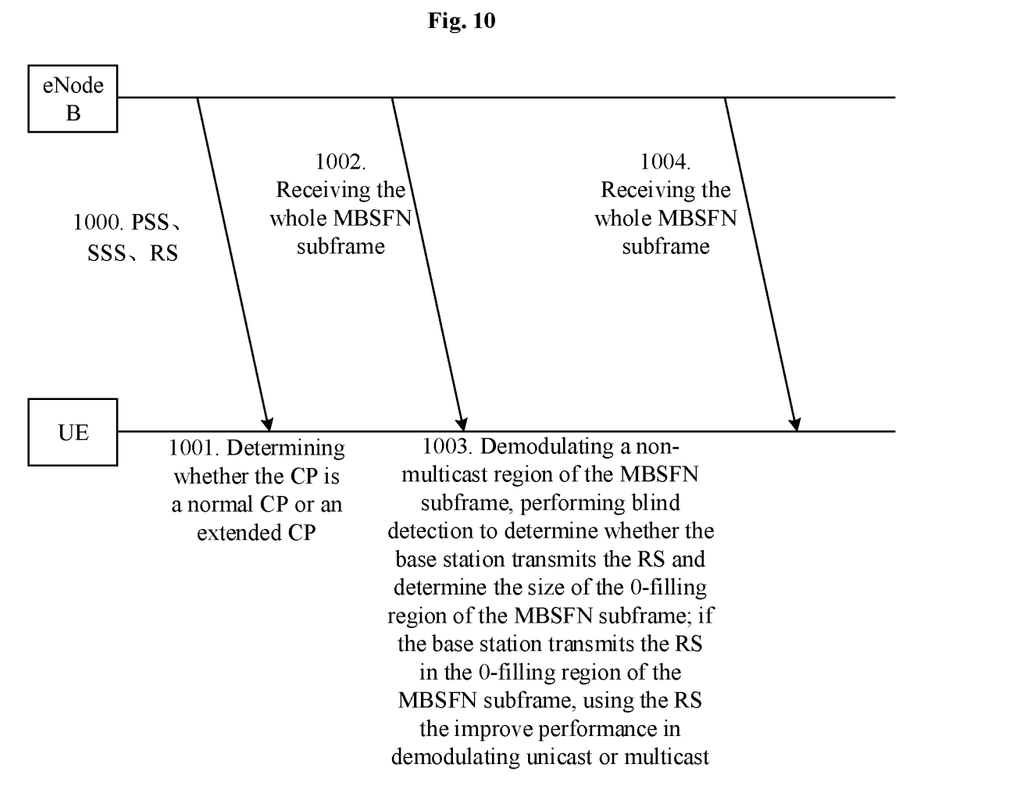
FIG. 10 is a flowchart of a second embodiment of an MBSFN subframe processing method of the present disclosure.

FIG. 10 is a flowchart of a second embodiment of an MBSFN subframe processing method of the present disclosure. As shown in FIG. 10, the method may include the following operations.

At S1000 to S1001, in the embodiment, the UE determines that the CP is the normal CP in the cell selection stage.

At S1002, the UE receives the signal of the MBSFN subframe in the entire Transmission Time Interval (TTI), that is, 1 ms signal.

At S1003, the UE analyzes a Physical Hybrid ARQ Indicator Channel (PHICH) and obtains the size of the non-multicast region of the MBSFN subframe. The UE calculates the average received power RSRP, assumed as $P_0$, of the signal transmitted in the 0-filling region of the MBSFN subframe, and calculates the received SINR as $SINR_0$. In a case where $P_0$ is greater than the preset noise and interference threshold, and $SINR_0$ is greater than the preset SINR threshold, the UE determines that the base station has transmitted the RS in the 0-filling region of the MBSFN subframe. In this way, the UE determines a time-domain position of the 0-filling region of the MBSFN subframe, and takes out the RS in the 0-filling region of the MBSFN subframe. Then the UE can use the obtained RS to improve performance in demodulating unicast or multicast.

The above is only the exemplary embodiments of the present disclosure and not intended to limit the protection scope of the present disclosure. Any modifications, equivalent replacements, improvements and the like within the principle of the present disclosure should fall within the protection scope of the claims of the present disclosure.

What is claimed is:

1. A Multicast Broadcast Single Frequency Network (MBSFN) subframe processing method, comprising:
   placing, by a base station, an MBSFN Reference Signal (RS) in a 0-filling region of an MBSFN subframe, wherein the 0-filling region of the MBSFN subframe is a time frequency position where 0 is filled in an OFDM symbol adjacent to an MBSFN domain in a non-MBSFN domain; and
   transmitting, by the base station, the MBSFN subframe carrying the MBSFN RS.

2. The MBSFN subframe processing method according to claim 1, wherein the placing, by the base station, the MBSFN RS in the 0-filling region of the MBSFN subframe comprises:
   placing the MBSFN RS in the 0-filling region of the MBSFN subframe in an ascending order of frequency.

3. The MBSFN subframe processing method according to claim 1, wherein the placing, by the base station, the MBSFN RS in the 0-filling region of the MBSFN subframe comprises:
   in a case where the MBSFN RS consists of two groups of completely consistent sequences, placing one group of sequences at positions of even-numbered subcarriers in the 0-filling region of the MBSFN subframe, and placing the other group of sequences at positions of odd-numbered subcarriers in the 0-filling region of the MBSFN subframe.

4. The MBSFN subframe processing method according to claim 1, further comprising:
   sending, by the base station, indication information through a system message to notify User Equipment (UE) whether the MBSFN subframe carries the MBSFN RS.

5. The MBSFN subframe processing method according to claim 4, wherein the system message is a System Information Block-13 (SIB13) message.

6. The MBSFN subframe processing method according to claim 5, wherein the sending, by the base station, the indication information through the system message to notify the UE whether the MBSFN subframe carries the MBSFN RS comprises:
   using one bit in a late Non Critical Extension field of the SIB13 message as the indication information to indicate whether there is MBSFN RS transmitted in the 0-filling region of the MBSFN subframe.

7. A non-transitory computer-readable storage medium, in which a computer-executable instruction is stored, wherein the computer-executable instruction is used for executing the Multicast Broadcast Single Frequency Network (MBSFN) subframe processing method according to claim 1.

8. A Multicast Broadcast Single Frequency Network (MBSFN) subframe processing apparatus, comprising a processor and a memory, wherein a computer program capable of running in the processor is stored in the memory for executing the operations of the MBSFN subframe processing method according to claim 1.

9. A base station, comprising the Multicast Broadcast Single Frequency Network (MBSFN) processing apparatus according to claim 8.

10. A Multicast Broadcast Single Frequency Network (MBSFN) subframe processing method, comprising:
    determining, by User Equipment (UE), that a 0-filling region of an MBSFN subframe carries an MBSFN Reference Signal (RS), wherein the 0-filling region of the MBSFN subframe is a time frequency position where 0 is filled in an OFDM symbol adjacent to an MBSFN domain in a non-MBSFN domain; and
    determining, by the UE, a time-domain position of the 0-filling region of the MBSFN subframe, and obtaining, by the UE, the MBSFN RS in the 0-filling region of the MBSFN subframe.

11. The MBSFN subframe processing method according to claim 10, wherein the determining, by the UE, that the 0-filling region of the MBSFN subframe carries the MBSFN RS comprises:
    reading, by the UE, indication information in a system message from a base station, and determining, by the UE according to the indication information, whether the 0-filling region of the MBSFN subframe carries the MBSFN RS.

12. The MBSFN subframe processing method according to claim 11, wherein the system message is a System Information Block-13 (SIB13) message;
    the determining, according to the indication information, whether the 0-filling region of the MBSFN subframe carries the MBSFN RS comprises:
    determining, according to the indication information in alate Non Critical Extension field of the SIB13, whether there is MBSFN RS transmitted in the 0-filling region of the MBSFN subframe.

13. The MBSFN subframe processing method according to claim 10, wherein the determining, by the UE, that the 0-filling region of the MBSFN subframe carries the MBSFN RS comprises:
    performing, by the UE, blind demodulation in the 0-filling region of the MBSFN subframe, and determining, by the UE according to obtained signal characteristics, whether the 0-filling region of the MBSFN subframe carries the MBSFN RS.

14. The MBSFN subframe processing method according to claim 13, wherein the signal characteristics comprise: an average power of a received signal in the 0-filling region of the MBSFN subframe and a Signal-to-Noise Ratio (SINR) of the received signal in the 0-filling region of the MBSFN subframe;
    the determining, according to the obtained signal characteristics, whether the 0-filling region of the MBSFN subframe carries the MBSFN RS comprises:
    in a case where the obtained average power of the received signal in the 0-filling region of the MBSFN subframe is greater than a preset noise and interference threshold, and/or the SINR of the received signal in the 0-filling region of the MBSFN subframe is greater than a preset SINR threshold, determining that the 0-filling region of the MBSFN subframe carries the MBSFN RS.

15. A non-transitory computer-readable storage medium, storing a computer-executable instruction, wherein the computer-executable instruction is used for executing the Multicast Broadcast Single Frequency Network (MBSFN) subframe processing method according to claim 10.

16. A Multicast Broadcast Single Frequency Network (MBSFN) subframe processing apparatus, comprising a processor and a memory, wherein a computer program capable of running in the processor is stored in the memory for executing the operations of the MBSFN subframe processing method according to claim 10.

17. User Equipment (UE), comprising the Multicast Broadcast Single Frequency Network (MBSFN) processing apparatus according to claim 16.

18. The MBSFN subframe processing method according to claim 1, wherein a transmitting power of the MBSFN RS in the 0-filling region of the MBSFN subframe is set to be equal to a transmitting power of an RS in a multicast region of the MBSFN subframe.

19. The MBSFN subframe processing method according to claim 10, wherein a transmitting power of the MBSFN RS in the 0-filling region of the MBSFN subframe is set to be equal to a transmitting power of an RS in a multicast region of the MBSFN subframe.

20. The MBSFN subframe processing method according to claim 10, wherein the MBSFN RS is placed in the 0-filling region of the MBSFN subframe in an ascending order of frequency.

\* \* \* \* \*